(12) United States Patent
Hoyon (10) Patent No.: US 12,434,745 B2
(45) Date of Patent: Oct. 7, 2025

(54) ARTICULATION DEVICE FOR AN ARTICULATED VEHICLE, CORRESPONDING VEHICLE AND ADJUSTMENT METHOD

(71) Applicant: ALSTOM HOLDINGS, Saint-Ouen-sur-Seine (FR)

(72) Inventor: Christophe Hoyon, Courçon D'Aunis (FR)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 863 days.

(21) Appl. No.: 17/754,057

(22) PCT Filed: Sep. 21, 2020

(86) PCT No.: PCT/EP2020/076295
§ 371 (c)(1),
(2) Date: Mar. 22, 2022

(87) PCT Pub. No.: WO2021/058431
PCT Pub. Date: Apr. 1, 2021

(65) Prior Publication Data
US 2022/0340181 A1 Oct. 27, 2022

(30) Foreign Application Priority Data
Sep. 23, 2019 (FR) ........................ 1910463

(51) Int. Cl.
*B61G 5/02* (2006.01)
*B61D 3/10* (2006.01)
(52) U.S. Cl.
CPC ................ *B61G 5/02* (2013.01); *B61D 3/10* (2013.01)

(58) Field of Classification Search
CPC ................................. B61D 3/10; B61G 5/02
See application file for complete search history.

(56) References Cited

U.S. PATENT DOCUMENTS

2008/0216703 A1  9/2008  Hermant

FOREIGN PATENT DOCUMENTS

| CN | 106985876 A1 | 7/2017 | |
|---|---|---|---|
| DE | 102006013404 A1 * | 9/2007 | ............... B60D 5/00 |

(Continued)

OTHER PUBLICATIONS

International Search Report issued for International Patent Application No. PCT/EP2020/076295, dated Nov. 25, 2020 in 5 pages.

(Continued)

*Primary Examiner* — Robert J McCarry, Jr.
(74) *Attorney, Agent, or Firm* — Knobbe, Martens, Olson & Bear, LLP (57) ABSTRACT

This articulation device for an articulated vehicle comprises a first shackle (14), a second shackle (16), and an articulation joint (18) comprising a first articulation member (20) comprising a single first section (52) and a second articulation member (22) comprising a single second section (60). The first section (52) and the second section (60) are rotatable relative to each other; the first shackle (14) is connected to the first articulation member (20) and the second shackle (16) is connected to the second articulation member (22). The second articulation member (22) comprises a single connecting member (66) through which the second section (60) is connected to the second shackle (16), the connecting member (66) being adapted to adjust the position of the second section (60) relative to the second shackle (16) along a longitudinal axis (X2-X2) and along a transverse axis (Y2-Y2).

11 Claims, 5 Drawing Sheets

(56) References Cited

FOREIGN PATENT DOCUMENTS

EP          2695790  A1    2/2014
WO    2005/037621  A1    4/2005

OTHER PUBLICATIONS

French Search Report issued for French Patent Application No. FR 19 10463, dated May 18, 2020 in 2 pages.

* cited by examiner

ARTICULATION DEVICE FOR AN ARTICULATED VEHICLE, CORRESPONDING VEHICLE AND ADJUSTMENT METHOD

CROSS-REFERENCE TO RELATED APPLICATIONS

This application is the U.S. National Phase under 35. U.S.C. § 371 of International Application PCT/EP2020/076295, filed Sep. 21, 2020, which claims priority to French Patent Application No. 1910463, filed Sep. 23, 2019. The disclosures of the above-described applications are hereby incorporated by reference in their entirety.

FIELD OF THE INVENTION

The present invention relates to an articulation device for an articulated vehicle, in particular for a railway vehicle, of the type comprising:
- a first shackle adapted to be attached to a first car of the articulated vehicle,
- a second shackle adapted to be attached to a second car of the articulated vehicle and
- an articulation joint comprising a first articulation member comprising a single first section, the articulation joint comprising a second articulation member comprising a single second section;
- the first section defining a first longitudinal axis, the second section defining a second longitudinal axis, the first section and the second section being rotatable relative to each other about a first transverse axis extending transversely to the first and second longitudinal axis, with the first shackle being connected to the first articulation member and the second shackle being connected to the second articulation member.

The invention applies to articulation devices between two cars of an articulated vehicle.

Articulated vehicles require several connections between each of the cars forming the vehicle in order to ensure the stability and safety of the vehicle during its movement. For this purpose, articulations are arranged in the space between the cars, especially at the bottom and top of the body.

BACKGROUND OF THE INVENTION

In order to obtain satisfactory movement between the cars, it is necessary to adjust the different articulations, in particular to ensure the alignment of the cars but also to align the different articulations to make then function properly.

For this purpose, it is known to use adjustable articulation joints comprising several sections. The state of the art comprises articulation devices comprising a shackle attached to a first car and two shackles attached to a second car, each of the shackles being linked to a section of the articulation joint. The sections connected to the shackles attached to the second car are adjustable in length, which makes it possible to adjust the configuration of the entire articulation joint as well as the relative position of the cars in a longitudinal and lateral direction.

However, known rail vehicle articulations are complex to adjust.

SUMMARY OF THE INVENTION

An object of the invention is to provide an articulation device for an articulated vehicle device that is easy to adjust.

For this purpose, the invention has as its object an articulation device of the aforementioned type, characterized in that the second articulation member comprises a single connecting member through which the second section is connected to the second shackle, the connecting member being adapted to adjust the position of the second section relative to the second shackle along the second longitudinal axis and along a second transverse axis extending perpendicularly to the second longitudinal axis and the first transverse axis.

According to other advantageous aspects of the invention, the articulation device for an articulated vehicle comprises one or more of the following features, taken alone or in any technically possible combination:
- the connecting member defines the position of the second section adjustably, relative to the second shackle along the second longitudinal axis, independent of the adjustment of the second section relative to the second shackle along the second transverse axis;
- the first articulation member comprises:
  - a first adjustable stop movable relative to the first section along the first longitudinal axis, and
  - a first clamping member;
- the first adjustable stop and the first clamping member being adapted to fasten the first section relative to the first shackle;
- the second articulation member comprises:
  - a second adjustable stop movable relative to the second section along the second longitudinal axis, and
  - a second clamping member,
- the second adjustable stop and the second clamping member being adapted to fasten the connecting member relative to the second section;
- the connecting member is rotatable relative to the second section about the second longitudinal axis, the second shackle defines a third longitudinal axis parallel to the second longitudinal axis and offset from the second longitudinal axis, the connecting member being rotatable relative to the second shackle along the third longitudinal axis, and the device includes at least one fastening member adapted to fasten the connecting member relative to the second shackle, the first section is preferably movable relative to the second section along the vertical axis over a range of between −20 mm and +20 mm;
- the connecting member is movable in translation along the second transverse axis relative to the second shackle, and the articulation device comprises at least one fastening member adapted to fasten the connecting member relative to the second shackle.

The invention further relates to an articulated vehicle comprising
- a first car, and
- a second car,
- wherein the vehicle comprises an articulation device for an articulated vehicle as defined above, the first shackle being attached to the first car and the second shackle being attached to the second car.

The invention also relates to a method for adjusting an articulation device for an articulated vehicle comprising the following steps:
- adjusting the position of the connecting member by translating the connecting member relative to the second section along the second longitudinal axis; and
- fastening the connecting member to the second section by the second adjustable stop and the second clamping member.

The method according to the invention may comprise any of the following series of steps:
adjusting the position of the connecting member by rotating the connecting member relative to the second shackle along the third longitudinal axis; and
fastening the connecting member to the second shackle by the at least one fastening member;
or,
adjusting the position of the connecting member by translating the connecting member relative to the second shackle along the second transverse axis; and
fastening the connecting member to the second shackle by the at least one fastening member.

BRIEF DESCRIPTION OF THE DRAWINGS

The invention will be better understood upon reading the following description, given only as a non-limiting example and made with reference to the drawings in which.

DETAILED DESCRIPTION OF THE PREFERRED EMBODIMENTS

In the following description, a direct orthonormal basis (X, Y, Z) is considered. The elevation direction Z is defined according to the height of the vehicle and corresponds to the vertical direction, for example, when the vehicle is on a horizontal track. The longitudinal direction X corresponds to the front-rear direction of the vehicle and the transverse direction Y corresponds to the direction along the width of the vehicle.

The terms "upper" and "lower" as well as "high" and "low" are defined relative to the elevation direction z. the terms "left" and "right" are defined relative to the transverse direction y in the normal direction of travel of the vehicle.

Figure 1:
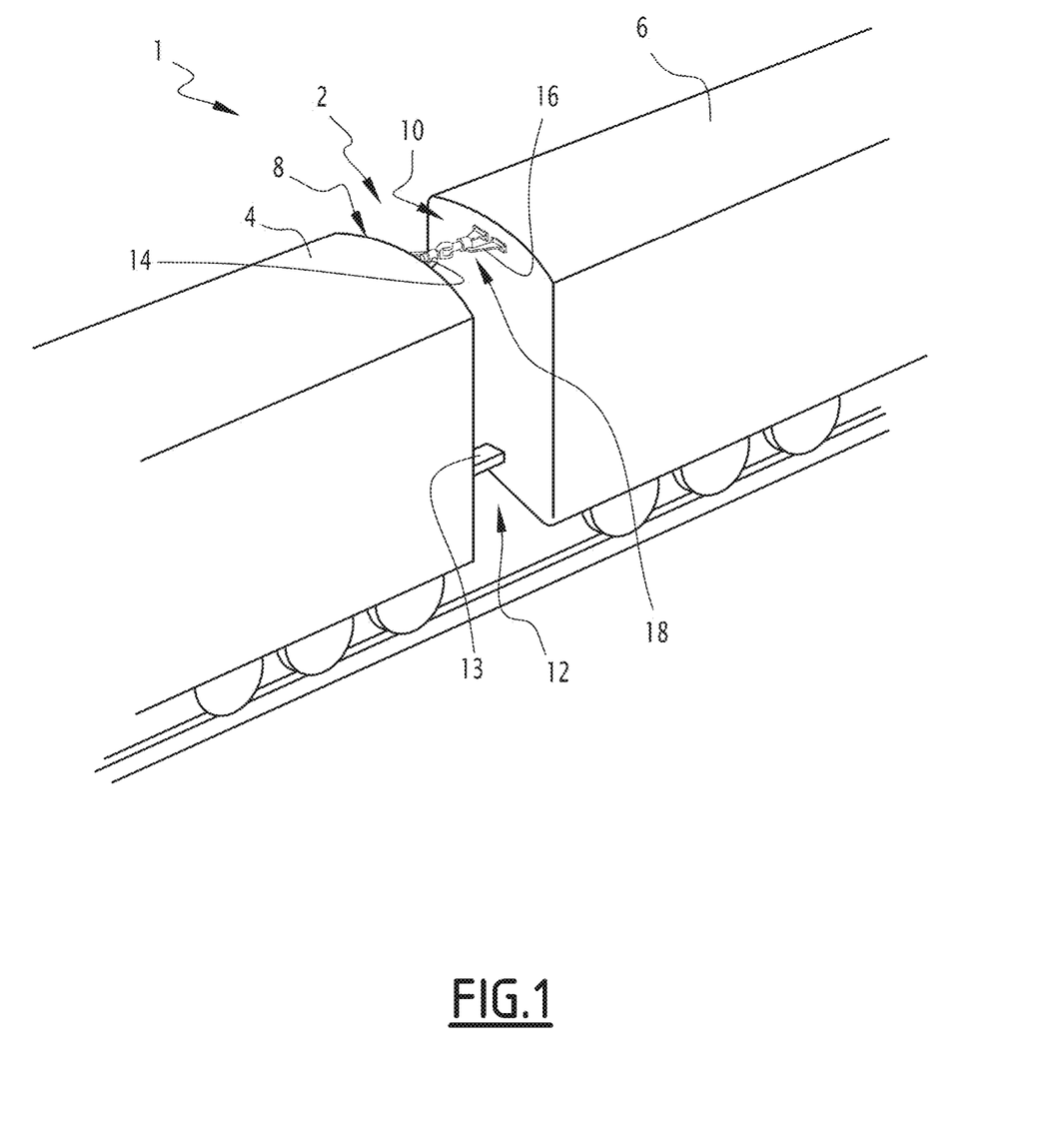
FIG. 1 is a schematic perspective representation of an articulated vehicle according to the invention.

An articulated vehicle 1 provided with an articulation device 2 is partially illustrated in FIG. 1. The articulated vehicle 1 is a self-propelled vehicle, for example.

With reference to FIG. 1, the articulated vehicle 1 comprises a first car 4 and at least one second car 6, adjacent and connected to the first car 4 by the articulation device 2. The first car 4 comprises a first transverse end wall 8 and the second car 6 comprises a second transverse end wall 10. Together, the first wall 8 and the second wall 10 define an inter-car space 12 between them.

Preferably, the articulated vehicle 1 also comprises at least one shock absorber extending into the inter-car space 12 between the first car 4 and the second car 6. Advantageously, the articulated vehicle 1 also comprises at least one shock absorber in the lower body and at least one shock absorber in the upper body.

The articulation device 2 extends into the inter-car space 12. In particular, the articulation device extends into the upper part of the inter-car space 12. The articulated vehicle 1 preferably comprises a coupling 13 connecting the first car 4 and the second car 6.

The articulation device 2 (see FIG. 2) comprises a first shackle 14 attached to the first car 4, a second shackle 16 attached to the second car 6 and an articulation joint 18 connecting the first shackle 14 and the second shackle 16.

Figure 2:
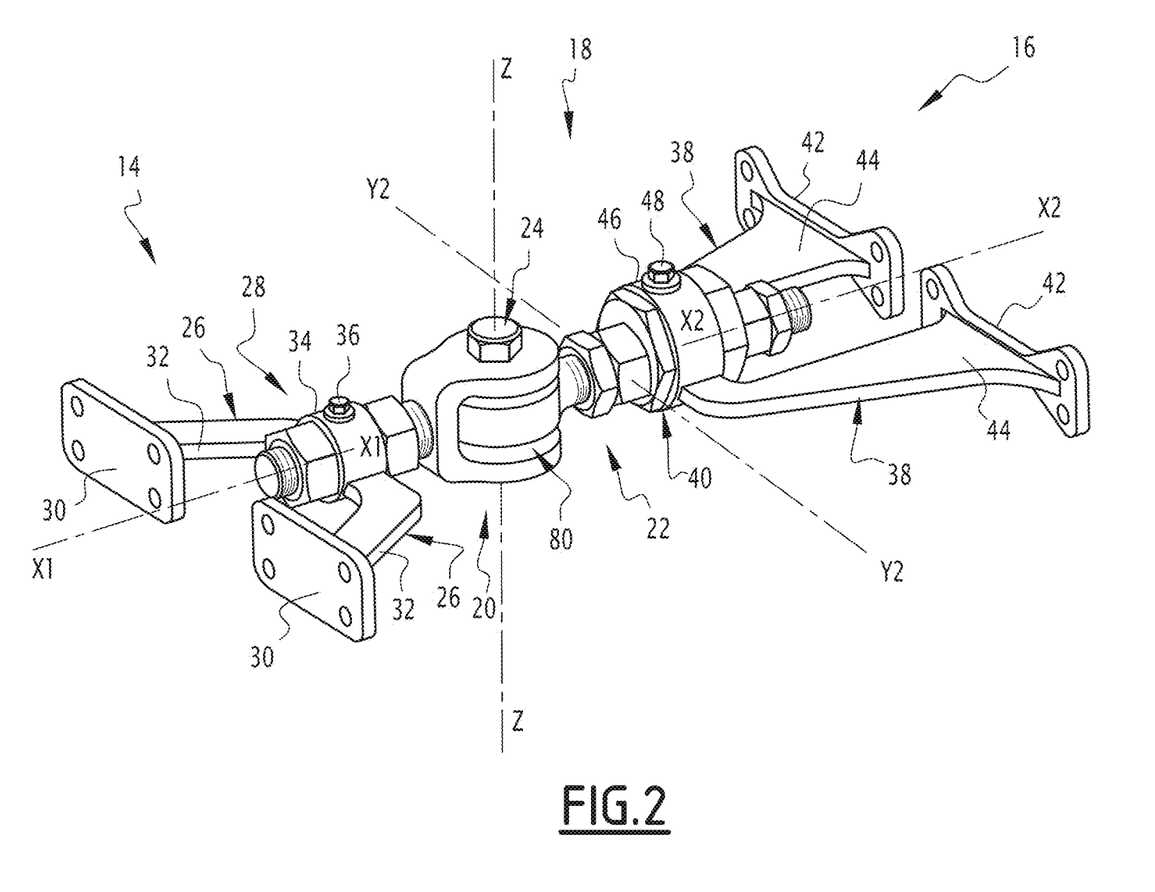
FIG. 2 is a schematic perspective representation of a first embodiment of an articulation device for an articulated vehicle according to the invention.

The articulation joint 18 comprises a first articulation member 20, a second articulation member 22 and a rotation member 24, the first articulation member 20 being rotatable relative to the second articulation member 22 about the rotation member 24.

The first shackle 14 comprises two first retaining tabs 26 on the first car 4 and a first interaction area 28 with the first articulation member 20.

Each first retaining tab 26 includes a first planar section 30 attached to the first transverse wall 8 and a first retaining arm 32 connecting the planar section 30 to the first interaction area 28.

The first interaction area 28 includes a first ring 34 and a first pin 36 insertable into the first ring 34.

The first ring 34 and the first retaining tabs 26 are integrally formed, with the first retaining tabs 26 extending on either side of the periphery of the first ring 34.

The first pin 36 is radially insertable into the first ring 34 and is adapted to be secured to the first ring 34, by screwing, for example.

Figure 3:
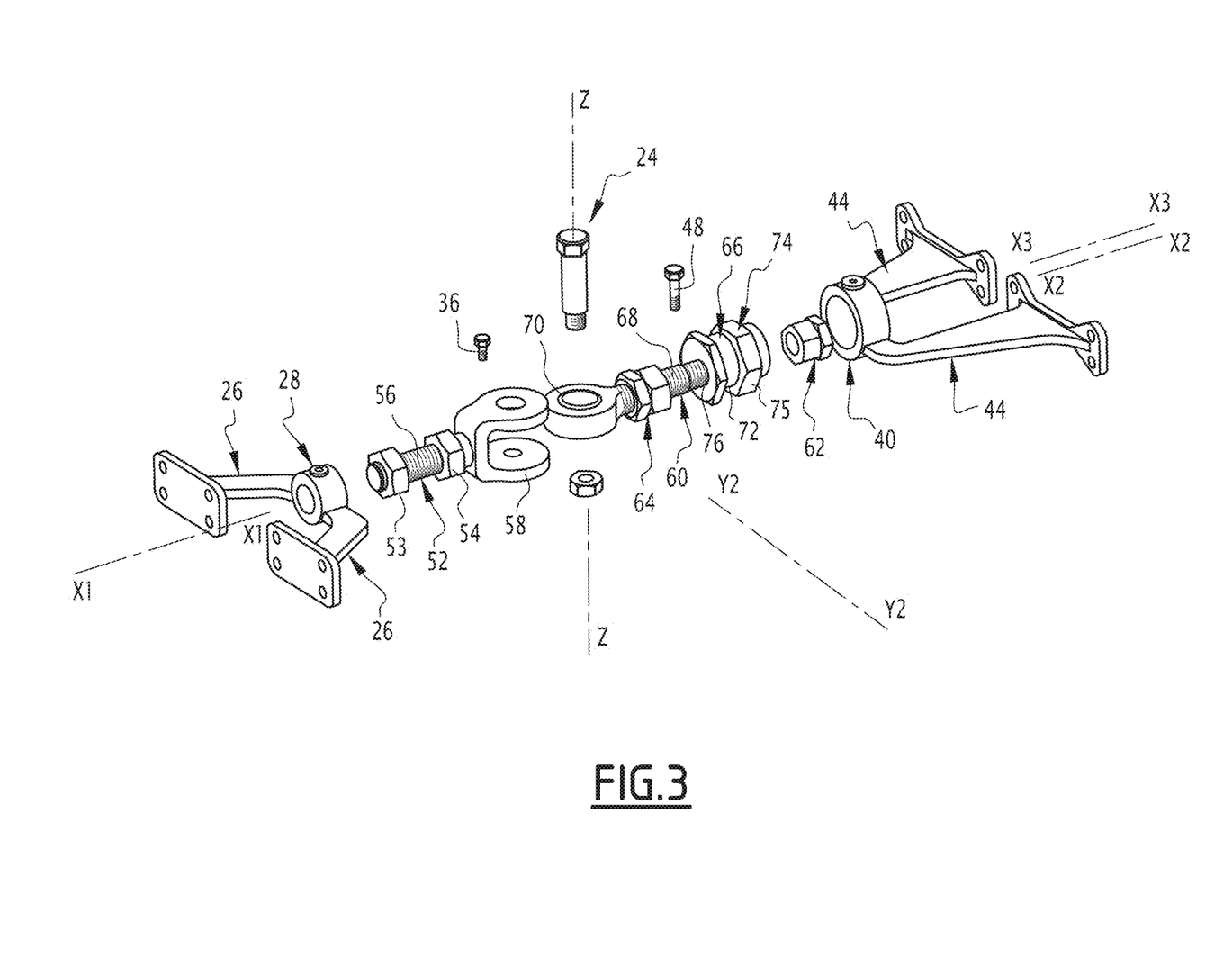
FIG. 3 is a schematic exploded perspective representation of the first embodiment of the articulation device for an articulated vehicle according to the invention.

According to a first embodiment illustrated in FIGS. 2 and 3, the second shackle 16 comprises two second retaining tabs 38 on the second car 6 and a second cooperation area 40 with the second articulation member 22. Each second retaining tab 38 includes a second planar section 42 attached to the second transverse wall 10 and a second retaining arm 44 connecting the second planar section 42 to the second interaction area 40. The second interaction area 40 includes a second ring 46 and according to a particular embodiment a second pin 48 insertable into the second ring 46. The second ring 46 and the second retaining tabs 38 are integrally formed, with the retaining tabs 38 extending on either side of the periphery of the second ring 46. The second pin 48 is radially insertable into the second ring 46 and is adapted to be secured to the second ring 46, by screwing, for example.

The first articulation member 20 comprises a single first section 52 a first adjustable stop 53 provided on the first section 52 and a first clamping member 54. The term "single first section" 52 means that the articulation device 2 does not comprise any other elements that transmit forces between the first and second shackles 14 and 16 in parallel to this first section 52. The articulation device 2 does not have any other shackles attached to the first and second cars 4 and 6. In other words, all of the force flow between the first and second shackles 14 and 16 passes through the first section 52.

The first section 52 comprises a first elongated section 56 on which the first adjustable stop 53 and the first clamping member 54 are installed, the first section 52 further including a first U-shaped rotation section 58.

The first elongated section 56 defines a first longitudinal axis (X1-X1) of the first section 52. The first elongated section 56 is a threaded bar, for example. The first elongated section 56 interacts with the first ring 34 and the outer diameter of the first elongated section 56 is substantially equal to the inner diameter of the first ring 34.

The first elongated section 56 comprises a groove oriented along the longitudinal axis (X1-X1). The first pin 36 is inserted into this groove, the first elongated section 56 and therefore the first section 52 being translatable along the first longitudinal axis (X1-X1) relative to the first shackle 14. On the other hand, the first pin 36 and the groove block rotation of the first ring 34 relative to the first elongated section 56.

The first U-shaped rotation section 58 comprises two substantially planar areas in opposition, and substantially horizontal when the articulation device 2 is installed on the articulated vehicle 1. The two substantially planar areas each comprise an opening, the openings being aligned and adapted to accommodate the rotation member 24. The two planar areas are connected to each other by a connecting area, the connecting area itself being connected to the first elongated section 56.

The first adjustable stop 53 is movable relative to the first section 52 in translation along the longitudinal axis (X1-X1) along the first elongated section 56. The first adjustable stop 53, in the installed position, is adapted to be immobile relative to the elongated section 56. The first adjustable stop 53 is a nut, for example.

The first clamping member 54 is translatable along the longitudinal axis (X1-X1) along the first elongated section 56. The first clamping member 54 is adapted, in the installed position, to be immovable relative to the elongated section 56. The first clamping member 54 is a nut, for example.

The first adjustable stop 53 and the first clamping member 54 are adapted to secure the first section relative to the first shackle. In particular, the first adjustable stop 53 and the first clamping member 54 are positioned on either side of the first ring 34 and define the position of the first articulation member 20 relative to the first shackle 14 along the first longitudinal axis (X1-X1).

The rotation member 24 passes through the first rotation section 58 from side to side in a vertical direction when the articulation device 2 is installed on the vehicle 1. The rotation member 24 defines a first transverse axis (Z-Z), the first articulation member 20 and the second articulation member 22 being rotatable about the first transverse axis (Z-Z). The rotation member 24 comprises a bolt, for example, surrounded by a sleeve adapted to reduce friction.

The second articulation member 22 comprises a single second section 60, a second adjustable stop 62 on the second section 60, a second clamping member 64, and a single connecting member 66 through which the second section 60 is connected to the second shackle 16. The term "single second section" 60 means that the articulation device 2 does not have any other elements that transmit forces between the first and second shackles 14 and 16 in parallel to this second section 60. In other words, the entire flow of force between the first and second shackles 14 and 16 passes through the second section 60.

The second section 60 comprises a second elongated section 68 on which the second adjustable stop 62 and the second clamping member 64 are installed, the second section 60 also including a second O-shaped rotation section 70.

The second elongated section 68 defines a second longitudinal axis (X2-X2) of the second section 60. The second elongated section 68 is a threaded bar, for example. The second elongated section 68 interacts with the connecting member 66.

The second O-shaped rotation section 70 is integral with one end of the second section 60 and defines an opening aligned with the openings of the first rotation section 58. The opening of the second rotation section 70 is adapted to receive the rotation member 24.

The respectively second rotation section 70 or second section 60 is rotatable about the first transverse axis (Z-Z) relative to the respective first rotation section 58 or first section 52.

The first transverse axis (Z-Z) extends transversely to the first longitudinal axis (X1-X1) and to the second longitudinal axis (X2-X2), regardless of the angle formed between the first longitudinal axis (X1-X1) and the second longitudinal axis (X2-X2).

The connecting member 66 adjustably defines the position of the second section 60 relative to the second shackle along a second longitudinal axis (Y2-Y2) extending perpendicular to the second longitudinal axis (X2-X2) and the first transverse axis (Z-Z).

The connecting member 66 adjustably defines the position of the second section 60 relative to the second shackle along the second longitudinal axis (X2-X2) independently of the adjustment of the second section (60) relative to the second shackle (16) along the second transverse axis (Y2-Y2).

According to the first embodiment illustrated in FIG. 2 and FIG. 3, the connecting member 66 is an eccentric 72 and the articulation device comprises a fastening member 74 such as an eccentric nut 75, for example.

The eccentric 72 defines a cylindrical outer contour interacting with the interior of the second ring 46. The second ring 46 defines a third longitudinal axis (X3-X3), which is the central axis of this ring. The longitudinal axis of the cylindrical outer contour of the eccentric 72 is the third longitudinal axis (X3-X3).

The eccentric 72 further comprises an eccentric bore, the longitudinal axis of which is the second longitudinal axis (X2-X2). The second longitudinal axis (X2-X2) and the third longitudinal axis (X3-X3) are distinct and parallel. The second longitudinal axis (X2-X2) and the third longitudinal axis (X3-X3) are 8 mm apart.

The eccentric 72 is rotatable about the third longitudinal axis (X3-X3) in the second ring 46 and the second section is rotatable about the second longitudinal axis (X2-X2) in the eccentric bore 76 and is otherwise translatable along the second longitudinal axis (X2-X2) in the eccentric bore 72. The second section 60 is thus translatable in combination along the first (Z-Z) and second transverse axis (Y2-Y2), the path of the second section 60 relative to the second shackle 16 defining a cylinder coaxial with the third longitudinal axis (X3-X3).

The eccentric 72 comprises a threaded area, for example, adapted to interact with the fastener 74 and a shackle, adapted to be pressed against one side of the second ring 46.

The fastening member 74 is movable on the eccentric and is adapted to lock the eccentric 72 to the second ring 46. When the fastening member 74 locks the eccentric 72 to the second ring 46, the second ring 46 is clamped between the fastening member 74 and the shackle of the eccentric 72. The fastening member 74 thus blocks rotation of the eccentric 72 in the second ring 46.

According to the first embodiment, the gap between the two substantially planar areas of the first U-shaped rotation section 58 is greater than the height of the second O-shaped rotation section 70. This gap defines a vertical area clearance 80. The vertical area clearance 80 is between 0.5 mm and 10.5 mm, for example. The first section 52 is thus movable relative to the second section 60 along the vertical axis (Z-Z) over a range of between −8 mm and +8 mm.

Figure 4:
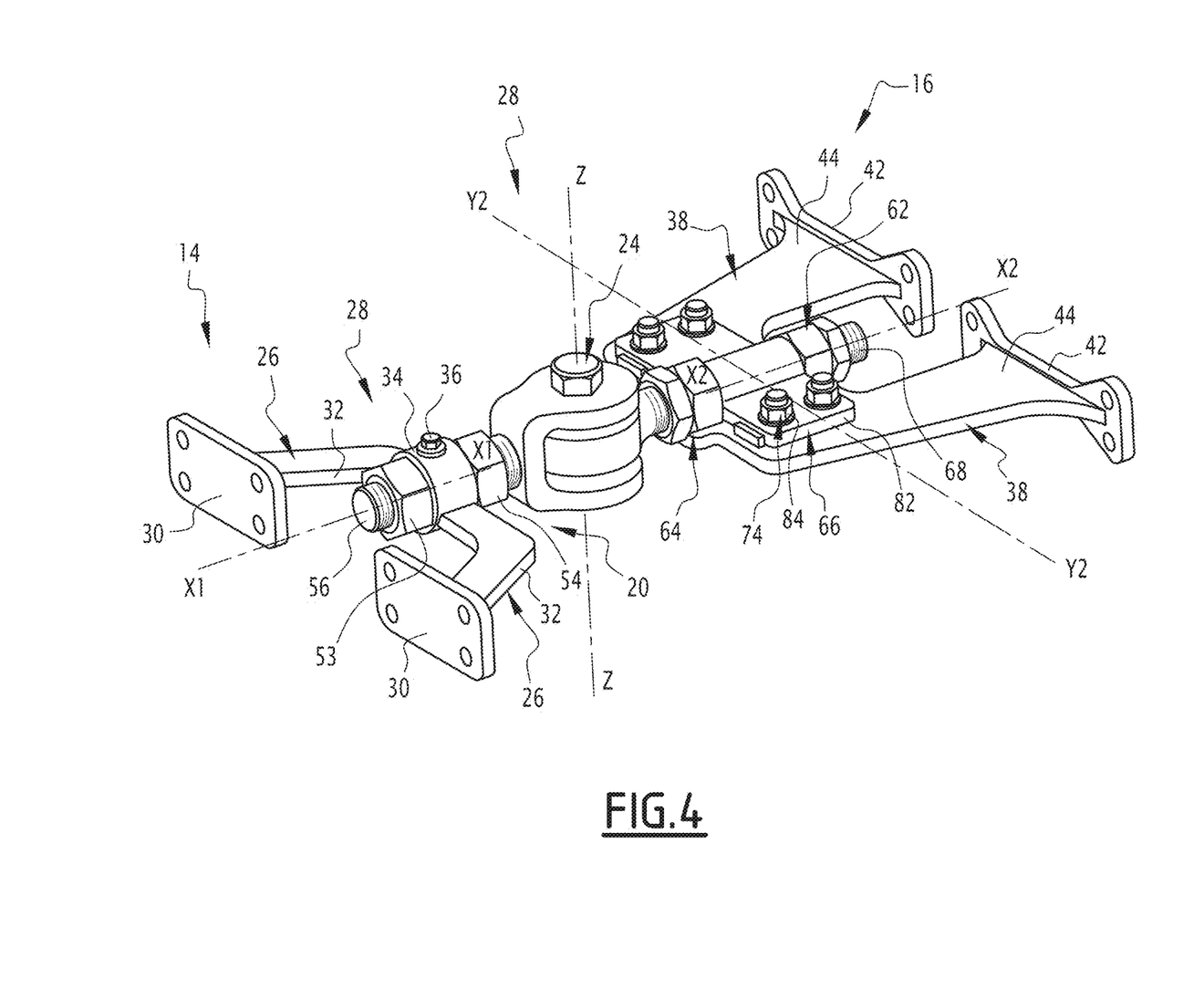
FIG. 4 is a schematic perspective representation of a second embodiment of the articulation device for an articulated vehicle according to the invention.
Figure 5:
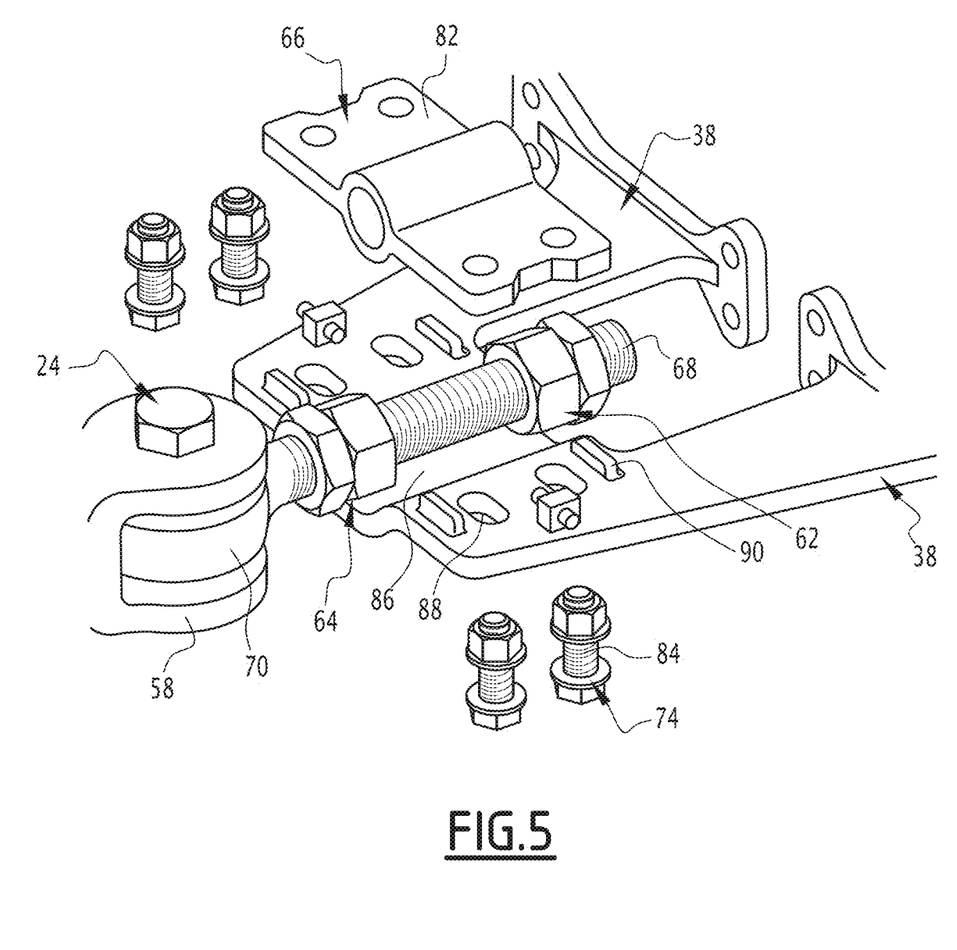
FIG. 5 is a schematic perspective representation of a detail of the second embodiment of the articulation device for an articulated vehicle according to the invention.

FIGS. 4 and 5 show a second embodiment of the articulation device 2. This embodiment differs from the first embodiment only as follows. Analogous elements have the same references.

According to the second embodiment, the connecting member 66 is a finned sleeve 82 and the articulation device 2 comprises a plurality of fastening members 74. Each fastening member 74 is a bolt 84, for example. The second shackle 16 does not comprise a second ring 46 but a flat area 86, connecting the second retaining tabs 38. The second shackle further includes elongated openings 88 and guide stops 90 extending on either side of the flat area 86.

The finned sleeve 82 is translatable relative to the second shackle 16 along the second transverse axis (Y2-Y2) between the guide stops 90.

Each fastener 74 is adapted to secure the finned sleeve 82 relative to the second shackle 16. Each fastening member thus makes it possible block translation of the finned sleeve 82 relative to the second shackle 16.

Regardless of the embodiment, the second adjustable stop 62 is movable relative to the second section 60 in translation along the second longitudinal axis (X2-X2) along the second elongated section 68. The second adjustable stop 62, in the installed position, is adapted to be immovable or fixed relative to the elongated section 68. The second adjustable stop 62 is a nut and a related lock nut, for example.

The second clamping member 64 is translatable along the second longitudinal axis (X2-X2) along the second elongated section 68. The second clamping member 64, in the installed position, is adapted to be immovable relative to the elongated section 64. The second clamping member 64 is a nut and a related lock nut, for example.

The second adjustable stop 62 and the second clamping member 64 are adapted to secure the connecting member 66 relative to the second section. In particular, the second adjustable stop 62 and the second clamping member 64 are positioned on either side of the connecting member 66 and define the position of the second articulation member 22 relative to the second shackle 16 along the second longitudinal axis (X2-X2).

A first method for adjusting an articulation device for an articulated vehicle according to the first embodiment shown in FIGS. 2 and 3 and a second method for adjusting an articulation device for an articulated vehicle according to the second embodiment shown in FIGS. 4 and 5 will now be described.

The adjustment is intended to adjust the position of the first car 4 relative to the second car 6. In particular, the adjustment is intended to ensure that the planes formed by the ends of the first 4 and second 6 cars and of the first 4 and second 6 are parallel. The planes formed by the ends of the first 4 and second 6 cars are formed by the first transverse wall 8 and by the second transverse wall 10, for example.

The first adjustment method comprises a step of adjusting the position of the connecting member 66 by rotating the connecting member 66 relative to the second shackle 16 along the third longitudinal axis (X3-X3). The position of the connecting member 66 relative to the second shackle 16 is determined during this step, in order to ensure the alignment of the ends of the first 4 and second 6 cars. The connecting member 66 in this adjustment method is the eccentric 82. Rotation about the third longitudinal axis (X3-X3) allows the second section 60 to be moved relative to the second shackle 16 along the first transverse axis (Z-Z) and simultaneously along the second transverse axis (Y2-Y2). The movement of the second section 60 relative to the second shackle 16 along the first transverse axis (Z-Z) causes the second rotation section 70 to move relative to the first rotation section 58 in translation along the first transverse axis (Z-Z). The movement along the first transverse axis (Z-Z) is made possible by the clearance 80 and thus does not cause any adjustment of the planes formed by the ends of the first 4 and second 6 cars or of the alignment of the ends of the first 4 and second 6 cars. In contrast, movement of the second section 60 relative to the second shackle 16 along the second transverse axis (Y2-Y2) leads to the adjustment of the alignment of the planes formed by the ends of the first 4 and the second 6 car.

The step of adjusting the position of the connecting member 66 relative to the second shackle 16 is followed by a step of fastening the connecting member 66 to the second shackle 16 by the at least one fastening member 74. According to this embodiment, the fastening member 74 is the eccentric nut 75, for example. In particular, the fastening member locks the eccentric 72 on the second ring 46 in the position determined in the adjustment step. The position determined is the position of the eccentric 72 in which the position of the second section 60 relative to the second shackle 16 along the second transverse axis (Y2-Y2) makes it possible to align the ends of the first 4 and second 6 cars.

The first adjustment method further comprises a step of adjusting the position of the connecting member 66 by translating the connecting member 66 relative to the second section 60 along the second longitudinal axis (X2-X2).

During this step, the position of the connecting member 66 is determined in order to ensure the parallelism of the planes formed by the ends of the first 4 and second 6 cars. The second adjustable stop 62 is positioned on the second section 60 in order to ensure an appropriate distance between the first car 4 and the second car 6 in the longitudinal direction X.

The step of adjusting the position of the connecting member 66 relative to the second section 16 is followed by a step of fastening the connecting member 66 to the second section 16 by the second adjustable stop 62 and the second clamping member 64. In this step, the second clamping member 64 is positioned on the second section 60 and the connecting member 66 is clamped between the second adjustable stop 62 and the second clamping member 64. In particular, the position of the connecting member 66 relative to the second section 60 along the second longitudinal axis (X2-X2) is set by the second adjustable stop 62 and the second clamping member 64.

The second adjustment method comprises a step of adjusting the position of the connecting member by translating the connecting member 66 relative to the second section 60 along the second longitudinal axis (X2-X2). During this step, the position of the connecting member 66 is determined in order to ensure that the planes formed by the ends of the first 4 and second 6 cars are parallel. The second adjustable stop 62 is placed on the second section 60 in order to ensure an appropriate distance between the first car 4 and the second car 6 in the longitudinal direction X.

The step of adjusting the position of the connecting member 66 relative to the second section 60 is followed by a step of fastening the connecting member 66 to the second section 60 by the second adjustable stop 62 and the second clamping member 64. In this step, the second clamping member 64 is positioned on the second section 60 and the connecting member 66 is clamped between the second adjustable stop 62 and the second clamping member 64. In particular, the position of the connecting member 66 relative to the second section 60 along the second longitudinal axis (X2-X2) is set by the second adjustable stop 62 and the second clamping member 64.

The second adjustment method further comprises a step of adjusting the position of the connecting member 66 by translating the connecting member 66 relative to the second shackle 16 along the second transverse axis (Y2-Y2). During this step, the position of the connecting member 66 relative to the second shackle 16 is determined in order to ensure the alignment of the ends of the first 4 and second 6 cars. In this adjustment method, the connecting member 66 is the finned sleeve 82 guided in translation along the second transverse axis (Y2-Y2) by the guide stops 90.

The step of adjusting the position of the connecting member 66 relative to the second shackle 16 is followed by a step of fastening the connecting member 66 to the second shackle 16 by the at least one fastening member 74. In this step, each fastening member 74 is used to secure the connecting member 66 to the second shackle 16. In particular, the position of the connecting member 66 relative to the second shackle 16 along the second transverse axis (Y2-Y2) is set by each fastening member 74.

The use of a single connecting member 66 makes it possible to facilitate adjustment of the articulation device 2 and the alignment as well as the parallelism between a first car 4 and a second car 6 of an articulated vehicle.

In particular, the independent adjustment of the position of the second section 60 relative to the second shackle 16 along the second longitudinal axis (X2-X2) and along the second transverse axis (Y2-Y2) makes it possible to facilitate adjustment by avoiding iterative adjustment of the longitudinal alignment and transverse alignment.

The use of a first adjustable stop 53 and a first clamping member 54 on the one hand and a second adjustable stop 62 and a second clamping member 64 on the other hand ensures the precise positioning of the rotation member 24 making proper rotation possible between the first articulation member 20 and the second articulation member 22.

According to the first embodiment, the presence of a clearance 80 in the first transverse direction (Z-Z) makes it possible to adjust the position of the second articulation member 22 in the second transverse direction (Y2-Y2) without generating any force in the first transverse direction (Z-Z).

What is claimed is:

1. An articulation device for an articulated vehicle comprising:
   a first shackle adapted to be attached to a first car of the articulated vehicle,
   a second shackle adapted to be attached to a second car of the articulated vehicle, and
   an articulation joint comprising a first articulation member comprising a single first section, the articulation joint comprising a second articulation member comprising a single second section,
   the first section defining a first longitudinal axis, the second section defining a second longitudinal axis, the first section and the second section being rotatable relative to each other about a first transverse axis extending transversely to the first longitudinal axis and the second longitudinal axis the first shackle being connected to the first articulation member and the second shackle being connected to the second articulation member;
   wherein the second articulation member comprises a single connecting member through which the second section is connected to the second shackle, the connecting member being adapted to adjust the position of the second section relative to the second shackle along the second longitudinal axis and along a second transverse axis extending perpendicularly to the second longitudinal axis and the first transverse axis.

2. The articulating device for an articulated vehicle according to claim 1, wherein the connecting member adjustably defines the position of the second section relative to the second shackle along the second longitudinal axis independent of the adjustment of the second section relative to the second shackle along the second transverse axis.

3. The articulation device for an articulated vehicle according to claim 1, wherein the first articulation member comprises:
   a first adjustable stop movable relative to the first section along the first longitudinal axis, and
   a first clamping member,
   the first adjustable stop and the first clamping member being adapted to set the first section relative to the first shackle.

4. The articulation device for an articulated vehicle according to claim 1, wherein the second articulation member comprises:
   a second adjustable stop movable relative to the second section along the second longitudinal axis, and
   a second clamping member,
   the second adjustable stop and the second clamping member being adapted to fasten the connecting member relative to the second section.

5. The articulation device for an articulated vehicle according to claim 1, wherein the connecting member is rotatable relative to the second section about the second longitudinal axis, wherein the second shackle defines a third longitudinal axis parallel to the second longitudinal axis and offset from the second longitudinal axis, the connecting member being rotatable relative to the second shackle along the third longitudinal axis, and wherein the device includes at least one fastening member adapted to fasten the connecting member relative to the second shackle.

6. The articulation device for an articulated vehicle according to claim 5, wherein the first section is movable relative to the second section along the vertical axis over a range of between −20 mm and +20 mm.

7. The articulation device for an articulated vehicle according to claim 1, wherein the connecting member is movable in translation along the second transverse axis relative to the second shackle, and wherein the articulation device comprises at least one fastening member adapted to fasten the connecting member relative to the second shackle.

8. An articulated vehicle comprising:
   a first car, and
   a second car,
   wherein the vehicle comprises an articulation device for an articulated vehicle according to claim 1, the first shackle being attached to the first car and the second shackle being attached to the second car.

9. A method of adjusting an articulation device for an articulated vehicle, the articulation device comprising:
   a first shackle adapted to be attached to a first car of the articulated vehicle,
   a second shackle adapted to be attached to a second car of the articulated vehicle, and
   an articulation joint comprising a first articulation member comprising a single first section, the articulation joint comprising a second articulation member comprising a single second section,
   the first section defining a first longitudinal axis, the second section defining a second longitudinal axis, the first section and the second section being rotatable relative to each other about a first transverse axis extending transversely to the first longitudinal axis and the second longitudinal axis the first shackle being connected to the first articulation member and the second shackle being connected to the second articulation member;

wherein the second articulation member comprises a single connecting member through which the second section is connected to the second shackle, the connecting member being adapted to adjust the position of the second section relative to the second shackle along the second longitudinal axis and along a second transverse axis extending perpendicularly to the second longitudinal axis and the first transverse axis, wherein the second articulation member comprises:
a second adjustable stop movable relative to the second section along the second longitudinal axis, and
a second clamping member,
the second adjustable stop and the second clamping member being adapted to fasten the connecting member relative to the second section,
the method comprising:
adjusting the position of the connecting member by translating the connecting member relative to the second section along the second longitudinal axis; and
fastening the connecting member to the second section by the second adjustable stop and the second clamping member.

10. A method of adjusting an articulation device for an articulated vehicle, the articulation device comprising:
a first shackle adapted to be attached to a first car of the articulated vehicle,
a second shackle adapted to be attached to a second car of the articulated vehicle, and
an articulation joint comprising a first articulation member comprising a single first section, the articulation joint comprising a second articulation member comprising a single second section,
the first section defining a first longitudinal axis, the second section defining a second longitudinal axis, the first section and the second section being rotatable relative to each other about a first transverse axis extending transversely to the first longitudinal axis and the second longitudinal axis the first shackle being connected to the first articulation member and the second shackle being connected to the second articulation member;
wherein the second articulation member comprises a single connecting member through which the second section is connected to the second shackle, the connecting member being adapted to adjust the position of the second section relative to the second shackle along the second longitudinal axis and along a second transverse axis extending perpendicularly to the second longitudinal axis and the first transverse axis,
wherein the connecting member is rotatable relative to the second section about the second longitudinal axis,
wherein the second shackle defines a third longitudinal axis parallel to the second longitudinal axis and offset from the second longitudinal axis, the connecting member being rotatable relative to the second shackle along the third longitudinal axis, and wherein the device includes at least one fastening member adapted to fasten the connecting member relative to the second shackle,
the method comprising:
adjusting the position of the connecting member by rotating the connecting member relative to the second shackle along the third longitudinal axis; and
fastening the connecting member to the second shackle by the at least one fastening member.

11. A method of adjusting an articulation device for an articulated vehicle, the articulation device comprising:
a first shackle adapted to be attached to a first car of the articulated vehicle,
a second shackle adapted to be attached to a second car of the articulated vehicle, and
an articulation joint comprising a first articulation member comprising a single first section, the articulation joint comprising a second articulation member comprising a single second section,
the first section defining a first longitudinal axis, the second section defining a second longitudinal axis, the first section and the second section being rotatable relative to each other about a first transverse axis extending transversely to the first longitudinal axis and the second longitudinal axis the first shackle being connected to the first articulation member and the second shackle being connected to the second articulation member;
wherein the second articulation member comprises a single connecting member through which the second section is connected to the second shackle, the connecting member being adapted to adjust the position of the second section relative to the second shackle along the second longitudinal axis and along a second transverse axis extending perpendicularly to the second longitudinal axis and the first transverse axis,
wherein the connecting member is movable in translation along the second transverse axis relative to the second shackle, and wherein the articulation device comprises at least one fastening member adapted to fasten the connecting member relative to the second shackle,
the method comprising:
adjusting the position of the connecting member by translating the connecting member relative to the second shackle along the second transverse axis; and
fastening the connecting member to the second shackle by the at least one fastening member.

* * * * *